(12) United States Patent
Lahtinen et al.

(10) Patent No.: US 12,059,817 B2
(45) Date of Patent: Aug. 13, 2024

(54) METHOD OF MANUFACTURING MOULDED ARTICLES

(71) Applicant: Woodio Oy, Helsinki (FI)

(72) Inventors: Petro Lahtinen, Helsinki (FI); Tuomo Nikkinen, Mäntyharju (FI); Timo Humalainen, Mäntyharju (FI)

(73) Assignee: Woodio Oy, Helsinki (FI)

( * ) Notice: Subject to any disclaimer, the term of this patent is extended or adjusted under 35 U.S.C. 154(b) by 539 days.

(21) Appl. No.: 17/278,343

(22) PCT Filed: Sep. 20, 2019

(86) PCT No.: PCT/FI2019/050679
§ 371 (c)(1),
(2) Date: Mar. 22, 2021

(87) PCT Pub. No.: WO2020/058579
PCT Pub. Date: Mar. 26, 2020

(65) Prior Publication Data
US 2022/0032495 A1   Feb. 3, 2022

(30) Foreign Application Priority Data

Sep. 21, 2018   (FI) .................................... 20185787

(51) Int. Cl.
*B27N 3/02*   (2006.01)
*B27N 3/00*   (2006.01)
(Continued)

(52) U.S. Cl.
CPC .............. *B27N 3/02* (2013.01); *B27N 3/002* (2013.01); *B27N 3/086* (2013.01); *B27N 3/203* (2013.01);
(Continued)

(58) Field of Classification Search
CPC ....... B29C 70/40; B29C 70/10; B29C 70/345; B29C 70/36; B29C 70/443; B29C 70/48;
(Continued)

(56) References Cited

U.S. PATENT DOCUMENTS 4,036,359 A   7/1977   Strickland, Jr.
4,623,499 A   11/1986  Fuma et al.
(Continued)

FOREIGN PATENT DOCUMENTS

CN   101143492 A   *   3/2008
CN   101232985 A       7/2008
(Continued)

OTHER PUBLICATIONS

CN101143492A-Machine Translation (Year: 2008).*
(Continued)

*Primary Examiner* — Yunju Kim
(74) *Attorney, Agent, or Firm* — Laine IP Oy

(57) ABSTRACT

A method of producing a moulded article comprising a thermoset polymer and particles of porous natural materials, such as wood materials, and uses thereof. The composite material has a continuous matrix of a hardened thermoset polymer and, distributed within the matrix, and the particles are at least partially encased by the thermoset polymer. The method comprises the steps of providing a mould with two opposite pressing surfaces, said pressing surfaces defining a space between them; feeding particles of porous natural materials into the space between the pressing surfaces; advancing the surfaces towards each other to compress the particles in said space; feeding unhardened thermoset resin in liquid form into the mould so as to fill at least said space between pressing surfaces while keeping the particles com-
(Continued)

pressed between the pressing surfaces; and curing the thermoset resin in the mould to provide a moulded composite article.

26 Claims, 1 Drawing Sheet

(51) Int. Cl.
    *B27N 3/08*          (2006.01)
    *B27N 3/20*          (2006.01)
    *B29C 70/48*         (2006.01)
    *B29K 101/10*       (2006.01)
    *B29K 311/14*       (2006.01)

(52) U.S. Cl.
    CPC .......... *B29C 70/48* (2013.01); *B29K 2101/10* (2013.01); *B29K 2311/14* (2013.01); *B29K 2995/0026* (2013.01); *B29K 2995/0029* (2013.01)

(58) Field of Classification Search
    CPC ..... B29C 70/543; B29C 70/548; B27N 3/002; B27N 3/02; B27N 3/04; B27N 3/086; B27N 3/203
    See application file for complete search history.

(56) References Cited

U.S. PATENT DOCUMENTS

| | | | |
|---|---|---|---|
| 5,736,081 | A | 4/1998 | Yamakawa et al. |
| 5,851,325 | A | 12/1998 | Terada et al. |
| 2001/0021447 | A1 | 9/2001 | Willemse et al. |
| 2002/0171162 | A1 | 11/2002 | Halahmi et al. |
| 2003/0046772 | A1 | 3/2003 | Halahmi et al. |
| 2003/0049428 | A1 | 3/2003 | Ryan |
| 2003/0077965 | A1 | 4/2003 | Mack et al. |
| 2003/0102604 | A1 | 6/2003 | Mack et al. |
| 2007/0007695 | A1 | 1/2007 | Forster |
| 2013/0000248 | A1 | 1/2013 | Semenivskyi et al. |
| 2014/0008842 | A1* | 1/2014 | Escribano ........... B29C 45/7207 425/165 |
| 2019/0322002 | A1* | 10/2019 | Pärssinen ............... B27N 3/002 |

FOREIGN PATENT DOCUMENTS

| | | |
|---|---|---|
| CN | 102470544 A | 5/2012 |
| CN | 103764379 A | 4/2014 |
| CN | 105108929 A | 12/2015 |
| CN | 107530985 A | 1/2018 |
| DE | 3707949 A1 | 9/1988 |
| EP | 0277238 A1 | 8/1988 |
| FR | 2947572 A1 | 1/2011 |
| JP | S59158242 A | 9/1984 |
| JP | H08142016 A | 6/1996 |
| JP | H11307663 A | 11/1999 |
| JP | 3055974 B2 | 6/2000 |
| JP | 2002036213 A | 2/2002 |
| JP | 2003305707 A | 10/2003 |
| JP | 2006130825 A | 5/2006 |
| JP | 2014008617 A | 1/2014 |
| WO | WO2006102543 A2 | 9/2006 |
| WO | WO2011001105 A1 | 1/2011 |
| WO | WO2018087428 A1 | 5/2018 |

OTHER PUBLICATIONS

EPOVIA KRF 1001 Technical data sheet_Cray Valley_Nov. 2008 (Year: 2008).*

Bialasz et al: An innovative method of polimeric sawdust boards production. International Scientific Journal "Innovations in Discrete Productions", Sep. 28, 2017, Issue 3, pp. 129-132.

Masoodi et al: Modeling the Processing of Natural Fiber Composites Made Using Liquid Composite Molding. Handbook of Bioplastics and Biocomposites Engineering Applications, 2011, pp. 43-47.

Ojala et al; Biomaterials—the greener solutions for composite industry. VTT Technical Research Centre of Finland, Nov. 20, 2013, p. 10.

Umer et al: Characterising wood fibre mats as reinforcements for liquid composite moulding processes. Composites Part A, Dec. 5, 2006, vol. 38, No. 2, pp. 434-448.

* cited by examiner

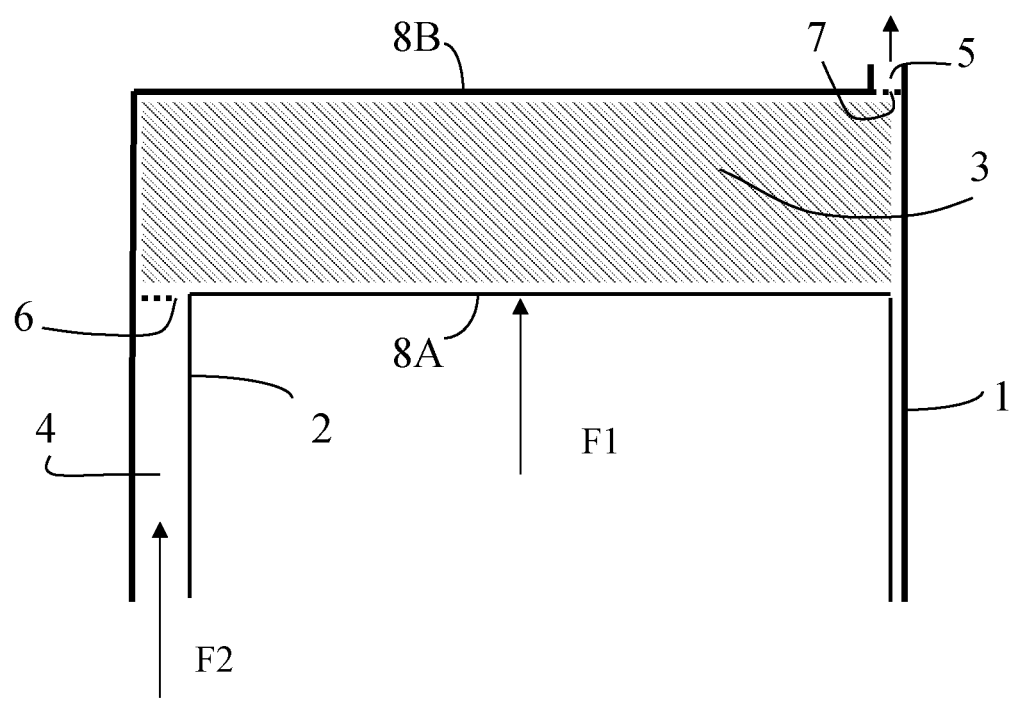

METHOD OF MANUFACTURING MOULDED ARTICLES

FIELD

The present invention relates to moulded articles comprising polymeric resins and particles of natural materials. In particular, the present invention concerns methods of producing moulded articles of polymeric resins and particles of natural materials.

BACKGROUND

Composites of polymer and wood are known in the art. Such composites are represented by wood panels, wherein the structural part of the material is formed by wood in the form of thin sheets, such as veneer, or particles. Examples include plywood and particles boards and various fibers boards.

A conventional particle board is an engineered wood product made from wood chips, sawmill shavings, sawdust, synthetic resin or any suitable binders. Particle boards serve as a cheaper, denser and more uniform alternative than conventional wood and plywood material. Particle boards can serve as a substitution material when cost reduction is a primary consideration rather than the physical attributes like strength and appearance of the article to be produced.

One major disadvantage of known composites of polymers and wood is that they are prone to volume expansion and discoloration as a result of absorption of moisture into the wood material. Lack of dimensional stability under the influence of moisture and water make wood panels, such as particle boards, unsuited for use in places where there are high levels of moisture are present. Therefore, for example conventional wood panels have to be protected by lamination or with paint or a sealer against water and moisture.

The conventional manufacturing method of particle boards is to form a plurality of layers of wood particles on a supporting surface, to spread adhesive resin over the layers and to compress the layers thus treated in a press by the use of heat for forming a compressed, hardened panel. Various improvements in the field of particle boards are discussed in JP03055974B2, JP2014008617A, JP2002036213A and EP0277238. Further composite materials are disclosed in US 2013000248 A1 and US 2003046772 A1

Layered structures of the above have poor peeling strength which means that the material will split under stress. When splitting occurs, the contact surface area is increased making it even more prone to absorption of water thus exacerbating the swelling of the article. Furthermore, the density differences between wood particles and thermosets gives rise to uneven distribution of the wood material within the thermoset matrix which aggravates the problem.

SUMMARY OF THE INVENTION

It is an aim of the present invention to eliminate at least a part of the problems relating to the art.

It is a first object of the invention, to provide a method of producing moulded articles formed by resins and particles of natural materials.

It is a second object of the invention to provide moulded articles.

It is a third object of the invention to provide uses of the articles.

According to a first aspect of the present invention, there is provided a method of producing a moulded article which comprises a composite material formed by a thermoset polymer and by particles of a porous natural material which has a density smaller than that of the polymer, the composite material having a continuous matrix of the hardened thermoset polymer and, distributed within the matrix, the particles of the natural material which are at least partially encased by the thermoset polymer, the method comprising providing a mould with two opposite pressing surfaces, the pressing surfaces defining a space between them; feeding the particles of the porous natural material into the space between the pressing surfaces; advancing the surfaces towards each other to compress the particles in the space; feeding unhardened thermoset resin in liquid form into the mould so as to fill at least the space between pressing surfaces while keeping the natural porous particles compressed between the pressing surfaces; and curing the thermoset resin in the mould to provide a moulded composite article.

According to a second aspect of the present invention, there is provided a moulded article obtained by a method according to the first aspect.

According to a third aspect of the present invention, there is provided use of an article according to the second aspect in structures which are subjected to continuous or occasional contact with water.

The present invention is based on the concept of providing a moulded article which is formed by a composite material which has a continuous matrix of a hardened thermoset polymer and particles of natural materials distributed within the matrix. The particles are at least partially encased by the thermoset polymer.

It has been found that an article of the present kind has a water absorbency of less than 1% by weight upon immersion into water over a time period of at least 168 h (week) at room temperature.

A moulded article of the present kind is obtained by the steps of providing a mould with two pressing surfaces which define a space between them; feeding particles of natural materials into the space; advancing the surfaces towards each other to compress the particles; feeding unhardened thermoset resin in liquid form into the mould so as to fill the space while keeping the particles compressed between the pressing surfaces; and curing the thermoset resin in the mould to provide a moulded composite article.

The novel moulded articles can be used in structures and objects which may be contacted with moisture or water.

More specifically, the present invention is characterized by what is stated in the characterizing portions of the independent claims.

Considerable advantages are obtained by the present invention. By the disclosed method the particles can be thoroughly impregnated with resin. Thus, it has surprisingly been found that the water absorption of the articles is small even when the surface of the articles is broken up to expose the inner parts of the articles. As a result, the present articles can be provided with apertures or bores without causing any significant swelling of the material. Water absorbency of the material making up the present moulded and compressed articles is typically less than 1% by weight even after one week of water contact at room temperature.

Typically, the particles are platy, and for example formed by wood chips. Such particles are, in embodiments of the invention, owing to their shape and form capable of self-organising into an interlocking, 3-dimensional structures on at least the outer surface of the mould during moulding.

Articles according to the present invention can be employed for manufacturing moulded articles which find use in the production of furniture and structural parts for indoor or outdoor use, in fixtures for kitchens and bathrooms, and on boats and similar floating vessels, for example for the manufacture of hulls. Since the compressed articles have good dimensional stability, they can be shaped into tiles for covering of surfaces, such as walls and floors.

The method will give rise to products having an excellent distribution of the particles within the thermoset matrix, irrespective of the difference in densities between the polymer and the natural, porous components.

Further features and advantages relating to particular embodiments of the present invention will appear from the following detailed description with reference to the attached drawing.

BRIEF DESCRIPTION OF THE DRAWING

FIG. 1 shows in a schematic fashion the main parts of a mould according to one embodiment of the invention.

EMBODIMENTS

Definitions

In the present context, the term "porous natural materials" stands for materials of natural original origin (i.e. which can be obtained from nature). Such materials are mainly or solely constituted by natural polymers. The materials can be used as such or after mechanical, chemical or thermal processing. The materials are porous in the respect that they have minute interstices through which liquid or air may pass.

In the present context, the term "wood particles" stands for finely divided wood parts, such as sawdust or wood chips or combinations thereof.

In the present context, the term "wood chips" stands for particles of wood obtained by cutting or chipping of larger pieces of wood. The "wood chips" can vary in sizes and quality and they can be obtained from various sources. Typically, logs are used as a raw-material, but also other sources can be used, both virgin materials and recycled materials. Typically, the present particles, for example chips, have a sieved size in the range of 0.2 to 20 mm, in particular 0.3 to 10 mm. Thus, for example the particles, in particular chips, used can have a sieved size of 1 to 10, in particular 1 to 7.5 mm, depending for examples on the dimensions, in particular thicknesses, of the articles which are to be manufactured.

In the present context, the term "moulding" is the process of manufacturing by shaping a liquid or pliable raw material using a rigid frame (also referred to as a "mould").

In the present context, "moulded article" stands for an article obtained by moulding. Typically such an article has been obtained by flattening using pressure, or by squeezing or pressing, the materials.

"Thermosetting resin" is a polymeric substance that is capable of changing irreversibly into an insoluble polymer network typically by cross-linking during a process referred to as "curing" to form a "thermoset polymer". In the present context it is preferred to provide a thermosetting resin which is, as such, liquid at room temperature, or which is capable of forming a liquid phase at room temperature, e.g. by the action of a solvent. Conventionally, the thermosetting resin can be characterized as a prepolymer, which has a lower molecular weight than the material obtained by curing thereof.

As will appear the unhardened thermosetting resin is typically provided "in liquid form" which stands for the resin being capable of flowing.

"Room temperature" stands for a temperature in the range of 10 to 30° C., in particular 15 to 25° C.

"Curing" is a process that transforms a thermosetting resin into a hardened thermoset material ("thermoset polymer") by cross-linking of individual chains of the polymeric substance of the resin under the influence of heat or suitable radiation, often under increased pressure, or by the use of hardeners.

"Hardeners" are typically substances which achieve cross-linking of the chains of the polymeric substance. Examples of hardeners include compounds containing reactive groups selected from the group of epoxy groups, amine groups, vinyl groups and allyl groups and combinations thereof. Also unsaturated compounds, with one or several unsaturated bonds in the main chain of the molecule, can be used as hardeners. Such compounds can optionally have reactive groups of the kind mentioned in the foregoing. Independent on the cross-linking process, it can be facilitated by catalysts at chemically active sites.

"Relative humidity" is defined as the ratio of the partial pressure of water vapour in a mixture of air and water to the equilibrium vapour pressure of water over a flat surface of pure water at a given temperature. Relative humidity is normally expressed as a percentage representing the ratio of the actual water vapour pressure to the saturation vapour pressure so that a higher percentage means that the air-water mixture is more humid.

As appears from the above, a moulded article according to the present technology in particular comprises or consists of a composite material which comprises at least two components, viz. a thermoset polymer and a natural material, the latter being provided in the form of porous particles. In the article, the thermosetting forms, after hardening into a thermoset polymer, a continuous matrix. Distributed within that matrix there are the porous particles of a natural material, for example in the form of wood particles, such as wood chips or other platy particles, which are at least partially encased by the thermoset polymer. In particular the individual particles are at least partially encased by the thermoset polymer.

Typically, of the moulded article, the natural material, such as chips or other platy particles of wood, forms more than 30%, in particular 40 to 95%, by volume of the article. In particular, the natural material part of the moulded articles forms at least 50% and up to 90% by volume of the article.

In the present context, "platy particles" are particles in which the ratio of the thickness of the plate to the smaller of the width or length of the edges of the plate edges is typically 1:1 to 1:500, for example on the order of 1:2 up to 1:50. Thus, for example, the woody particles include at least 10% by weight of chip-like particles, in which the ratio of general dimension are on the order of thickness:width:length=1:1-20:1-100. At least one of the dimensions is substantially different (greater or smaller) than another.

In one embodiment, "platy" particles of the present invention comprise wood particles with at least two dimensions greater than 1 mm, whereas one dimension is greater than 0.1 mm. In one embodiment, the average volume of the wood particles is at least 0.1 $mm^3$ more specifically at least 1 $mm^3$.

The porous natural materials used in the form of particles typically meet specific criteria. Thus, the material is lighter than the thermoset polymer, i.e. the material has a density which is smaller than that of the thermoset polymer. Typically, the porous natural material has a density which is at least 10%, or at least 20%, in particular at least 30%, for example at least 50% smaller than that of the thermoset polymer. Thus, the density of the porous natural material is typically in the range of 100 to 500 kg/m$^3$, in particular 150 to 450 kg/m$^3$. The weight portion of natural material to the thermoset material is about 10:90 to 60:40, in particular 30:70 to 55:45, for example about 40:60 to 50:50.

The particles of the natural materials are further porous to the extent that they can be at least partially impregnated with the thermoset resin (and thus the thermoset polymer).

In preferred embodiments, the particles of the natural material have a dimensional stability which makes it possible to form a static bed composed of separate particles. In such a bed, the particles can be immobilized under compression. The dimensional stability is further preferably sufficient for the particles to resist a collapse of their porous structure under compacting, as discussed below.

In preferred embodiments, the particles of a porous natural material are stabilized in the moulding space between the pressing surfaces by means of compression. In other words, the particles are interlocked so that they remain immobilized in the moulding space even during subsequent infeed and flow of a thermoset polymer into the moulding space. Preferably, the particles are organized and stabilized to a three-dimensional structure by compressing them between the pressing surfaces to a mechanically secured configuration before and during feeding of the thermoset polymer into the moulding space between said surfaces.

Preferably, the particles of a porous natural material are chip-formed and have a density that is smaller than the density of the thermoset polymer. In some embodiments, the shape of the particles is substantially flat or plate-like so that all dimensions of the particles are substantially smaller than the dimensions of the moulding space. In other embodiments, the shape of the particles is elongated.

As a result, the composite material has a continuous matrix of the hardened thermoset polymer and, distributed evenly within and throughout the matrix, the particles of a porous natural material. The particles are at least partially encased by the thermoset polymer.

An advantage of the present invention is that a homogenous object can be manufactured, without resin-rich areas or segregation of particles. A further advantage is that three-dimensional objects, particularly such three-dimensional objects in which the thickness of the object varies, can be manufactured easily. The shape of the moulded article can be a sphere, for example.

Typically, the porous particles are selected from cellulosic materials; lignocellulosic materials; and materials derived from cellulosic or lignocellulosic materials by mechanical, chemical or thermal processing. The mechanical processing includes for example the actions of cutting, chipping, grinding, refining, defibering and crushing. The chemical processing includes contacting of the material with chemicals for leaching out of components (such as lignin or extractives of lignocellulosic materials) or dissolving and renegating (such as the forming of fibers). The thermal processing includes heating and calcination of the materials while maintaining the porosity or while generating a new porous structure.

Examples of natural materials are cellulose, for example in the form of material derived from wood or annual or perennial plants, cotton, linen, flax, ramie, jute. The materials can be virgin materials or recycled or combinations thereof. Further examples include carbon material, such as carbon nanofibers.

In one aspect of the invention the amount of particles of porous natural materials, such as wood chips, that is contained in the composite material is 1 to 60 parts by weight, in particular 10 to 40 parts by weight, for example about 25 to 35 parts by weight, per 100 parts by weight of hardened thermoset polymer.

The volume of the particles of porous natural materials, such as wood chips, that are encased by the thermoset polymer within the thermoset polymer matrix is at least 20% by volume, in particular 30 to 100% by volume. In one embodiment, at least 50% by volume, in particular 70 to 100% by volume, of the particles of the porous natural material are enclosed by the thermoset polymer within the thermoset polymer matrix.

The article has low water absorbency. In particular, the water absorbency is less than 2% by weight, or even less than 1% by weight, upon water contact, for example immersion into water, over a time period of at least 72 h, in particular one week (168 h) at room temperature.

In one embodiment, the composite material consists essentially of at least one thermoset polymer forming a matrix with wood particles, in particular wood chips, which preferably are embedded fully or partially within the polymer matrix. Thus, more than 95% by weight of the material is formed by the two components discussed above.

In another embodiment, the composite material contains additionally other components. Thus, there can be present fillers which add to the strength properties. Additives can be added to the mixture before moulding to improve the structural properties of the material, with additives, such as hardener, where cross-linking can strengthen the elasticity of the thermoset resin.

For the production of the moulded article, the particles and a thermosetting resin are combined to give a mixture, which then is given a predetermined shape during compression of the mixture, while hardening of the resin. Typically, the mixture is given the shape determined by the moulding surface. One suitable process for moulding the mixture is known as resin transfer moulding.

In one embodiment, wood is used as a porous natural material for providing the present porous particles.

In one embodiment wood particles, such as chips, are admixed with the thermosetting resin in a moulding space, as will be disclosed in more detail below, to form a polymer-wood particles mix which is moulded under pressure and optionally increased temperature (a temperature higher than room temperature) to form a moulded article. When forming the mixture in the mould, the liquid resin and the wood particles are thoroughly contacted to achieve an even distribution of the wood chips in the liquid phase.

In one embodiment, particles of natural materials, such as wood chips, are distributed throughout the polymer matrix of the composite material such that, typically, a majority of the individual particles (by weight) within the composite material matrix are covered with the thermoset polymer and preferably at least partially impregnated with it.

In one embodiment, wood chips are used in the making of the moulded material. They are in particular selected such that the wood material can be evenly distributed within the polymer resin mixture. Typically, the wood chips have a sieved size of 1 to 10 mm, for example 1 to 7.5 mm, or 0.3 to 5 mm, for example 0.5 to 3 mm, respectively. The sieved size of the wood chips may influence the amount of water being absorbed and the corresponding degree of swelling in the wood chips.

In one embodiment, the particles of a porous natural material, in particular wood chips, have a moisture content of less than 20% by weight, in particular less than 18% by weight, typically less than 15% by weight, for example less than 10% by weight. In one embodiment, the wood chips have a moisture content of less than 8% by weight, for example less than about 6%, such as about 0.1 to 5% by weight. As discussed below, the wood chips can be thermally treated before use. In addition to the other effects attainable, such treatment will also reduce the humidity of the chips.

The wood chips that can be used in the invention can be of any type but they are preferably selected from the group of coniferous and deciduous wood chips and combinations thereof. In particular, the chips are porous. In one embodiment, the chips are chips of aspen, alder or pine or combinations thereof.

Typically, the chips are at least partially encased by the resin. Since the resin is used in liquid phase and the wood material typically is porous, such as is the case of chips obtained by chipping of aspen, poplar or spruce, at least partial impregnation of the chips with liquid resin can be achieved prior to final hardening of the resin.

In addition or alternatively to wood particles in the form of chips, the wood particles may also comprise wood dust, sawdust or wood granules. Generally, such particles have a medium sieved size of about 0.5 to 10 mm, in particular 1 to 5 mm.

One advantage of using wood particles in the form of chips is that the particles are capable of self-organizing within the polymer resin matrix such as to provide a three-dimensional structure. The structure in particular then comprises partly overlapping and optionally interlocking chips. Such a structure will also contribute to a stiffening of the moulded articles.

The thermoset polymer matrix that encases the wood particles essentially comprises hardened thermosetting resin. The resin can be of any type such as a polyester resin, in particular an aromatic polyester resin, or an epoxy resin or a urea formaldehyde resin or melamine formaldehyde resin or melamine urea-formaldehyde resin. Combinations of thermosetting resins can be used as well.

Examples of suitable polyester resins include products marketed under the trade marks Basonat®, Novolac®, Polylite® and Waterpoxy®.

The thermosetting resin can have components modifying its properties. In order to improve its fire resistance, inorganic substances, such as triphenyl phosphate and antimony trioxide, can be added as flame retardant additives. It is also possible to incorporated into the polymer monomers selected from halogenated dibasic acids and acid anhydrides, such as tetrachlorophthalic anhydride, tetrabromophthalic anhydride, dibromoneopentyl glycol and tetrabromo bisphenol-A. Such monomers can optionally be used as monomers in place of phthalic anhydride or propylene glycol.

As discussed above, a curing agent can be admixed with the resin to achieve curing. Thus, based on 100 parts by weight of the resin, 0.1 to 10 parts by weight of a curing agent selected from the group of epoxy groups, amine groups, vinyl groups and allyl groups and combinations thereof, can for example be added.

Further, to initiate or to accelerate the curing, a catalyst can also be added. One embodiment provides for the use of an accelerator containing peroxo groups, such as an organic or inorganic peroxide. A particularly preferred peroxide compound is methyl (ethyl) ketone peroxide for example provided in the form of a solution which can be added in an organic solvent to the resin or to the mixture of the resin and any curing agent, optionally in the presence of admixed wood particles. Examples of commercially available MEKP products include products marketed under the trade names Butanox, Chaloxyd, Di-Point, Kaymek, Ketonox, Lucidol, Luperox, Norox, Peroximon and Superox.

By the addition of a catalyst, curing can be initiated or even achieved already at room temperature. Typically, the catalyst is added at 0.1 to 75 parts by weight, for example 10 to 70 parts by weight, per 100 parts by weight of resin together with any hardening agent. In the case of unsaturated polyester resins, typically no separate hardener is needed and curing is reached with the addition of a peroxide catalyst.

Turning next to the drawing showing an embodiment of the present technology, it can be noted that a method is provided in which a moulded article, of the above kind, comprising a thermoset polymer and a wood material, is produced by moulding, in particular in a resin transfer mould.

It should be pointed out that the example is non-limiting and that particles of natural materials other than wood can be employed as well. By using wood chips materials of particularly good mechanical properties and visually attractive appearance can be obtained. However, the disclosure given below, for example in respect of various processing steps, including staining of the material, is also applicable to other materials of the present technology.

The mould 1, 2 employed typically comprises a compression zone defined by at least two opposite pressing surfaces 8A, 8B. The pressing surfaces will be capable of applying compression to any wood material fed into the compression zone 3. The other walls 1, 2 defining the zone are typically rigid and stiff and static. In the embodiment shown in the drawing they define two opposite end walls. The particles are filled into the space 3.

After the particles have been fed, for example poured or conveyed with a conveyor, into space 3, they typically form a non-compacted layer in the space. The pressing surfaces are the advanced against each other, or at least one of the pressing surfaces 8A is advanced against the other 8B, to compress the particles in said space. The compression force should be sufficient to compact the material in the compacting space. In particular, the compression force is sufficient to have the loose particles stay firmly mechanically secured inside the compacted material.

As will be appreciated from the below description, the compacting of the porous particles should be such that the particles still maintain their capability of absorbing (wicking) thermoset polymer within their porous structure.

After compacting of the particles, such as wood chips, the pressing surfaces can be locked in position.

In the next step, unhardened thermoset resin in liquid form is fed into the mould along a feeding channel 4 so as to fill at least said space between pressing surfaces while keeping the wood particles compressed between the pressing surfaces. The thermoset resin is cured in the mould to provide a moulded composite article.

During feed of the resin, gas, such as air, can be removed from the mould via outlet 5. The outlet 5 can also be used for applying reduced pressure to the inside of the mould 1 to assist feed of unhardened thermoset resin into the mould. The opening of outlet facing space 3 can be open. It can also be provided with a net or screen 7 to prevent any loose wood particles from flowing out from space 3. Similarly, the inlet 4 can be provided with a net or screen 6 at the inlet opening, as will be discussed below.

In one embodiment, the pressing surfaces (or just one of them 8A) are advanced towards each other to compress the wood particles in said space using a first pressure (F1). The feed of unhardened thermoset resin in liquid into the mould 1, 2 via the inlet 4 takes place at a second pressure (F2) so as to fill at least said space between pressing surfaces. Preferably, the first pressure (F1) is equal or greater than the second pressure (F2). In this respect, the term "first pressure" should be interpreted to include not only the pressure exerted towards the wood material for compacting the loose material, but also to the pressure exerted to the compacted material. In one embodiment, the wood particles are kept compressed using a pressure corresponding to the first pressure during the infeed of the unsaturated resin.

In one embodiment, the pressing surfaces 8A, 8B exhibit planar plates which are essentially arranged in parallel configuration. By such an arrangement, planar articles—potentially having a predetermined surface pattern—can be produced.

In one embodiment, which can be combined with any of the previous, the pressing plates can have a smooth pressing surface. Similarly, in another embodiment which can be combined with any of the previous, they can have a pressing surface which has a predetermined pattern of recesses and ridges.

In a method as disclosed above, unhardened thermoset resin in liquid form is laterally fed into the space between the pressing surfaces. As will become evident, liquid thermoset resin will flow in the lateral channels formed between the layer of wood particles and the end walls 1, 2 in the mould before the liquid is forced to flow into the wood particle layer.

The thermoset resin typically has flow viscosity and flows freely in liquid form. This allows for the use of narrow inlet channels 4 for feeding of the resin.

In one embodiment, the inlet flow channel 4 is so narrow that wood particles do not clog the inlet. Thus, the inlet flow channel 4 typically has a largest cross-section diameter of less than 20 mm, in particular less than 15 mm, preferably less than 10 mn, for example about 1 to 9 mm. Employing a narrow inlet channel 4, the opening of the inlet channel 4 facing space 3 can be open.

In another embodiment, the opening of inlet channel 4 facing space 3 can be provided with a net or screen 6 to avoid clogging of the inlet by any loose wood particles in space 8.

In one embodiment, the thermoset resin is fed into the mould 1 at a weight ratio of 100:1 to 50:100, in particular 100:10 to 80:100, for example 100:50 to 100:100 to the natural materials, such as wood particles.

In one embodiment, the thermoset resin is fed into the mould 1, 2 at a weight ratio of thermoset polymer to the natural material, such as wood particles, of 100 parts by weight of thermoset polymer to 1 . . . 60 parts by weight of natural material, such as wood, for example 100 parts by weight of thermoset polymer to 10 . . . 40 parts by weight of wood.

One embodiment comprises advancing the surfaces towards each other to compress the wood particles in said space using a first pressure (F1); feeding unhardened thermoset resin in liquid form at a second pressure (F2) into the mould so as to fill at least said space between pressing surfaces; and curing the thermoset resin in the mould to provide a moulded composite article, wherein the second pressure is at least 101 kPa, in particular about 150 to 10 MPa, for example 200 kPa to 2 MPa.

In another embodiment, curing is carried out at a temperature of 20 to 50° C.

In one embodiment, the mixture is moulded in said mould at a temperature of less than the boiling point of water.

According to one embodiment, wherein the wood chips are kept compressed between at least two pressing surfaces before they are contacted with the liquid, curable resin, the platy chips will be organized within the moulded article such that they overlap at least partially to form an essentially planar layer which overlapping chips interlocking to give a three-dimensional structure within the material.

The wood material can be pre-treated before it is admixed with a resin. Thus, for example, the material can be subjected to heat modification. Such heat modification treatments have in common that solid wood is subjected to temperatures close to or above 200° C., for example 150 to 250° C., in particular 170 to 240° C., for several hours in an atmosphere with low oxygen content. By this thermal modification some mechanical properties are reduced but the dimensional stability and the biological durability of wood is increased without adding outside chemicals or biocides to the wood.

Also other wood preservatives may be used which generally increase the durability and resistance from being destroyed by insects or fungus.

In one embodiment, the resin is transparent or translucent. The wood chips embedded in or with the matrix are then visually discernible on the outer surface down to the depth of at least 0.25 mm, in particular at least 0.5 mm, for example at least 1 mm. This will give the surface of the compressed article a three-dimensional appearance.

In one embodiment of the invention compressed article is provided in one or multiples of preselected colours. This selection of colour can be done during the process of producing the solution mixture of wood chips and resin. The wood chips are being stained or coloured in any other suitable way before being added to the mixture with the thermosetting resin. In this embodiment, it is preferred to have a thermosetting resin that is transparent or translucent once hardened so that the colour of the wood chips confer to the compressed article the appearance of the preselected colour.

Embodiments of the present technology solve the problem conventionally associated with swelling of polymer-wood-composites when exposed to water. The material of the present compressed material significantly reduces absorption of water and therefore also swelling of the material. As pointed out above, the water absorbency is typically less than 2%, in particular less than 1%, for example less than 0.8% by weight upon immersion of an object according to the present technology into water over a time period of at least 168 hours at room temperature. This reduction in water absorbency and swelling of the wood chips make the material appealing as a building material conventionally placed in contact with water, thereby giving it wider industrial applications.

In some embodiments, the moulded article has a water absorbency of less than 0.5%, in particular less than 0.3%, by weight upon immersion into water over a time period of at least 168 h at room temperature, in particular when using wood chips having sieved size between 0.5-3 mm as particles of porous natural materials.

In one embodiment, the compressed article is dimensionally stable at a humidity varying in the range from 0.5 to 100%. Dimensional stability of the article relates to the structural integrity of the article when it is exposed to moisture. The structural integrity may be referred to the expansion of wood chips or splitting of the material or any other structural changes to the material.

In one embodiment, the thermosetting resin with which the wood chips are mixed is capable of penetrating into the wood chips, at least partially, already during mixing and at the latest when the wood chips are in contact with the polymer in the moulding process.

As mentioned above, the porous natural material employed typically has a density which is smaller than that of the thermoset polymer. Thus, for example, the density of the wood chips is significantly smaller than that of the polymer resin, which means that the overall density of a moulded article formed from a thermoset polymer and wood chips can be adjusted according to the amount of wood chips being added to the polymer matrix.

In one embodiment the moulded article has a density which is at least 1%, in particular 2 to 10%, smaller than the density of an article that is made of purely hardened thermoset polymer. The article would then have a volume and each partial volume would amount to at least 1% of the volume of the article that has a density which is at least 5%, in particular 10 to 40%, smaller than the density of the hardened thermoset polymer as such.

In embodiments of the present invention, the densities of the articles formed by thermoset polymer and porous particles of natural materials are typically in the range of about 800 to 1500 kg/m$^3$, for example about 1000 to 1250 kg/m$^3$.

By using the above disclosed process, which can be characterized as modified transfer resin moulding process, in particular using platy particles, 3D (three-dimensional) surfaces can be created. The texture of the surface is dependent on the size of the used wood chips and on the potential patterning of the pressing surfaces.

Different coatings for composite material may be used for all of the above disclosed embodiments. The coating material is selected depending on the applications. Thus, for example, products exposed to water and less aggressive chemicals at varying temperatures, such as sanitary articles, can be coated with a gelcoat. Such a gelcoat can be based on isophthalic/neopenthylglycol polyester resin. Such a gelcoat will give a transparent surface with good chemical resistance. Typically the coating, e.g. the gelcoat, will have a thickness of about 0.1 to 10 mm, in particular about 0.2 to 5 mm, for example 0.25 to 3 mm.

INDUSTRIAL APPLICABILITY

The disclosed method can be used for producing various composites of polymers and particles of natural materials. In particular, the present method can be used for producing composites in which the natural materials are evenly distributed throughout the polymer matrix and thoroughly impregnated with resin. The composites can be formed into present articles which can be provided with apertures or bores without causing any significant swelling of the material. Articles produced find use in the production of furniture and structural parts for indoor or outdoor use, in fixtures for kitchens and bathrooms, and on boats and similar floating vessels, for example for the manufacture of hulls. Since the compressed articles have good dimensional stability, they can be shaped into tiles for covering of surfaces, such as walls and floors. They can also be used as structural and decorative panels.

REFERENCE NUMERALS 1, 2 mould walls
3 space (compression zone)
4 inlet
outlet
6, 7 screen
8A, 8B pressing surfaces

CITATION LIST

Patent Literature

JP03055974B2
JP2014008617A
JP2002036213A
EP2777238
US 2013000248 A1
US 2003046772 A1

The invention claimed is:

1. A method of producing a moulded composite article comprising:
providing a mould with two opposite pressing surfaces, the pressing surfaces defining a space between them;
feeding particles of a porous natural material into the space between the pressing surfaces;
advancing the pressing surfaces towards each other to compress the particles of the natural porous material in the space;
feeding unhardened thermoset resin in liquid form into the mould so as to fill at least the space between the pressing surfaces while keeping the particles of the porous natural material compressed between the pressing surfaces; and
curing the thermoset resin in the mould to provide the moulded composite article, the moulded composite article comprising the particles of the porous natural material distributed within the thermoset resin.

2. The method according to claim 1, wherein
the advancing of the pressing surfaces towards each other to compress the particles in the space is done at a first pressure (F1); and
the feeding of the unhardened thermoset resin in liquid form is done at a second pressure (F2) into the mould so as to fill at least said space between pressing surfaces;
wherein the first pressure (F1) is equal or greater than the second pressure (F2).

3. The method according to claim 1, wherein the advancing the surfaces towards each other for compressing the particles comprises having one stationary pressing surface and an opposite movable pressing surface which can be advanced in a direction towards the stationary surface.

4. The method according to claim 1, wherein the unhardened thermoset resin is in liquid form and is laterally fed into the space between the pressing surfaces.

5. The method according to claim 1, further comprising removing gas from the mould during the feeding of the unhardened thermoset resin.

6. The method according to claim 5, comprising applying a reduced pressure to the inside of the mould to assist the feeding of the unhardened thermoset resin into the mould.

7. The method according to claim 1, wherein the particles of the natural porous material are selected from the group consisting of porous cellulosic materials; lignocellulosic materials; and materials derived from cellulosic or lignocellulosic materials by mechanical, chemical or thermal processing.

8. The method according to claim 1, wherein the particles of the porous natural material are selected from the group consisting of particles, fibers, chips and granules of wood, annual or perennial plants, and materials obtained from wood, annual plants or perennial plants by mechanical, chemical or thermal processing.

9. The method according to claim 1, wherein the particles of the porous natural material comprise wood chips, wood granules or wood fibers, which are derived from deciduous or coniferous wood.

10. The method according to claim 1, wherein the particles of the porous natural material are selected from wood chips, and wherein at least a majority of the chips have a sieved size of 1 to 10 mm.

11. The method according to claim 1, wherein the unhardened thermoset resin is fed into the mould at a weight ratio of 100:1 to 50:100 to the particles of the natural porous material.

12. The method according to claim 1, wherein the mould is a resin transfer mould.

13. The method according to claim 1, wherein the curing is done at a temperature less than the boiling point of water.

14. The method according to claim 1, further comprising impregnating the particles of the porous natural material with the unhardened thermoset resin.

15. The method according to claim 1, wherein the particles of the natural porous material comprise particles in the form of platy particles, and wherein the platy particles are capable of self-organizing during moulding into an interlocking, 3-dimensional structure.

16. The method according to claim 1, wherein the curing in the mould is done by catalyst activation at room temperature.

17. The method according to claim 1, comprising contacting in the mould a liquid formed by the unhardened thermoset resin with the particles of the porous natural material at a weight ratio of 10:100 to 40:100.

18. The method according to claim 1, wherein the thermoset resin comprises a thermoset resin which is essentially transparent or translucent.

19. The method according to claim 1, wherein the thermoset resin comprises a polymer selected from the group consisting of a polyester resin, an epoxy resin, a urea formaldehyde resin, melamine formaldehyde resin, and a melamine ureaformaldehyde resin.

20. The method according to claim 1, wherein at least 50% by volume of the particles of the porous natural material are enclosed by the thermoset resin.

21. The method according to claim 1, wherein the moulded article comprises a water absorbency of less than 0.5% by weight upon immersion into water over a time period of at least 168 h at room temperature, and wherein the porous natural particles comprise wood chips having sieved size between 0.5-3 mm.

22. The method according to claim 1, further comprising applying on the surface of the moulded article a gelcoat coating.

23. The method according to claim 1, wherein the porous natural particles have a moisture content of less than 15% by weight before mixing with the thermoset resin during the feeding step.

24. The method according to claim 1, wherein the porous natural material has a density which is at least 10% less than that of the thermoset resin.

25. The method according to claim 1, wherein the particles of the natural material are at least partially encased by the thermoset polymer.

26. The method according to claim 1, wherein the unhardened thermoset resin is fed into the mould at a weight ratio of 100:10 to 80:100 to the particles of the porous natural material.

* * * * *